US010066587B2

(12) United States Patent
Ford et al.

(10) Patent No.: US 10,066,587 B2
(45) Date of Patent: Sep. 4, 2018

(54) METHODS AND SYSTEMS FOR A VARIABLE VOLUME ENGINE INTAKE SYSTEM

(71) Applicant: Ford Global Technologies, LLC, Dearborn, MI (US)

(72) Inventors: Kim Ford, Basildon (GB); Mark Stephen Brogan, Duxford (GB); Peter Graham Eastwood, Laindon (GB); Anthony Birri, London (GB); Thomas Ma, Chelmsford (GB); Geoff Charles Capon, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/424,030

(22) Filed: Feb. 3, 2017

(65) Prior Publication Data
US 2017/0226970 A1 Aug. 10, 2017

(30) Foreign Application Priority Data

Feb. 9, 2016 (GB) .................................. 1602324.4
Feb. 10, 2016 (GB) .................................. 1602345.9

(51) Int. Cl.
*F02M 35/16* (2006.01)
*F02M 35/10* (2006.01)
(52) U.S. Cl.
CPC ........ *F02M 35/10118* (2013.01); *Y02T 10/14* (2013.01)
(58) Field of Classification Search
CPC .......................... F02M 35/10118; Y02T 10/14

USPC ....................................... 123/184.55, 184.57
See application file for complete search history.

(56) References Cited

U.S. PATENT DOCUMENTS

| 4,726,329 | A | 2/1988 | Atkin |
| 4,969,536 | A | 11/1990 | Allen |
| 6,843,966 | B1 | 1/2005 | Mahr |
| 6,983,727 | B2 | 1/2006 | Narayanaswamy |
| 7,077,093 | B2 * | 7/2006 | Koelmel ................. F02B 27/02 123/184.24 |

(Continued)

FOREIGN PATENT DOCUMENTS

| CN | 102536546 B | 11/2013 |
| CN | 104612810 A | 5/2015 |

(Continued)

OTHER PUBLICATIONS

European Patent Office, Extended European Search Report Issued in Application No. 17151031.6, dated Jun. 2, 2017, Germany, 8 pages.

(Continued)

*Primary Examiner* — Marguerite McMahon
(74) *Attorney, Agent, or Firm* — Julia Voutyras; McCoy Russell LLP

(57) ABSTRACT

Methods and systems are provided for varying the volume of an engine intake system to increase the volumetric efficiency of the engine. In one example, a resonance system may be coupled to the engine intake system and a position of a movable element in the resonance system may be varied to vary the volume of the chamber in accordance with engine speed. The intake system provides improved volumetric efficiency for the engine.

20 Claims, 5 Drawing Sheets

(56) References Cited

U.S. PATENT DOCUMENTS

| | | | |
|---|---|---|---|
| 8,322,486 B2* | 12/2012 | Ohta | F02M 35/1294 123/184.57 |
| 2004/0255893 A1 | 12/2004 | Stuart | |
| 2009/0194056 A1 | 8/2009 | Hazelton et al. | |
| 2009/0285740 A1 | 11/2009 | Sobolevskiy et al. | |
| 2010/0065005 A1 | 3/2010 | Currie et al. | |
| 2013/0008402 A1* | 1/2013 | Muller | G10K 11/22 123/184.57 |
| 2013/0111901 A1 | 5/2013 | Leone et al. | |
| 2014/0223902 A1 | 8/2014 | Yacoub | |
| 2014/0230410 A1 | 8/2014 | Yacoub | |
| 2014/0230782 A1 | 8/2014 | Fabros | |
| 2014/0338628 A1* | 11/2014 | Ito | F02M 35/10091 123/184.55 |
| 2015/0152819 A1* | 6/2015 | Desjardins | F02M 35/1261 123/184.57 |

FOREIGN PATENT DOCUMENTS

| | | |
|---|---|---|
| CN | 205154371 U | 4/2016 |
| CN | 105673159 A | 6/2016 |
| DE | 8607920 U1 | 7/1986 |
| DE | 3820607 A1 | 12/1988 |
| DE | 4215416 A1 | 11/1993 |
| DE | 10217760 A1 | 11/2003 |
| EP | 0835995 A2 | 4/1998 |
| EP | 1205650 A2 | 5/2002 |
| EP | 2273096 A2 | 1/2011 |
| EP | 2803847 A1 | 11/2014 |
| FR | 2821119 A1 | 8/2002 |
| FR | 2838770 A1 | 10/2003 |
| FR | 2878561 A1 | 6/2006 |
| GB | 2221954 A | 2/1990 |
| JP | H04370320 A | 12/1992 |
| JP | H04370321 A | 12/1992 |
| JP | 2009103064 A | 5/2009 |
| JP | 2013007335 A | 1/2013 |
| KR | 20120067427 A | 6/2012 |
| WO | 2007020035 A1 | 2/2007 |
| WO | 2014051500 A1 | 4/2014 |

OTHER PUBLICATIONS

Examination Report for Great Britain Patent Application No. 1602324.4, dated Aug. 31, 2016, United Kingdom Intellectual Property Office, 8 pages.
Examination Report for Great Britain Patent Application No. 1602324.4, dated Dec. 8, 2016, United Kingdom Intellectual Property Office, 3 pages.
Examination Report for Great Britain Patent Application No. 1602345.9, dated Jul. 21, 2016, United Kingdom Intellectual Property Office, 7 pages.

* cited by examiner

METHODS AND SYSTEMS FOR A VARIABLE VOLUME ENGINE INTAKE SYSTEM

CROSS REFERENCE TO RELATED APPLICATION

The present application claims priority to Great Britain Patent Application No. 1602324.4, filed on Feb. 9, 2016, and to Great Britain Patent Application No. 1602345.9, filed on Feb. 10, 2016. The entire contents of each of the above-referenced applications are hereby incorporated by reference in their entirety for all purposes.

FIELD

The present description relates generally to system and methods for an engine, with an intake system configured to improve the volumetric efficiency of the engine.

BACKGROUND/SUMMARY

Intake systems for engines of motor vehicles are often designed with a fixed geometry, which is tuned to provide air to cylinders of the engine most effectively at a particular desirable engine running speed. The desirable engine running speed may be a speed at which the engine produces peak power or peak torque. Alternatively, the desirable engine running speed may be a speed at which the engine operates most efficiently when the vehicle is travelling long distances. Designing the geometry of the intake system such that it is tuned to a desirable engine speed may enhance the performance of the engine in this running condition.

Variable geometry inlet systems comprising variable length inlet ducts are available, which allow the tuning of the intake system to be varied during operation of the engine. However, packaging of intake systems is often tight, restricting the use of such systems.

In one example, the issues described above may be addressed by an intake system for an engine comprising: an intake duct configured to carry inlet air to cylinders of the engine; a chamber provided to one side of the intake duct and in fluid communication with the intake duct; a movable element provided within the chamber; and an actuator configured to vary the position of the movable element and thereby vary a volume of the chamber able to receive inlet air from the intake system; wherein the actuator is configured to vary the position of the movable element at a frequency, wherein the frequency varies according to the rotational speed of the engine.

The actuator may be configured to oscillate or reciprocate the movable element. The position of the movable element may be varied about a mean position.

The chamber may comprise a neck portion and a cavity portion, the neck portion having a smaller diameter than the cavity portion. A component of the mainstream flow velocity where the neck portion meets the intake duct may be perpendicular to a central axis of the neck portion, e.g. the central axis of the neck portion may be at an angle relative to the flow of inlet air within the intake duct where the neck portion meets the duct.

The intake system may further comprise an orifice configured to permit a flow of inlet air into and/or out of the chamber. The neck portion and the orifice may be separate or the orifice may form the neck portion.

The intake duct and/or the orifice may be configured such that a component of the mainstream flow velocity where the orifice meets the intake duct is perpendicular to a central axis of the orifice, e.g. an opening on the orifice. For example, the intake duct and/or the orifice may be configured such that the inlet air flowing within the intake duct may be directed at least partially across the orifice. The inlet air may also be directed at least partially into and/or out of the orifice, e.g. the opening of the orifice.

The engine may comprise one or more engine inlets. The engine inlets may be configured to selectively open to permit the inlet air to enter the cylinders.

The actuator may be configured to vary the position of the movable element according to the opening of the engine inlets, such as to vary the volume of the chamber according to the inlet which is opening, or is next to open.

The actuator may be configured to vary the frequency at which the position of the movable element varies according to the opening of the engine inlets, such as according to which inlet is open and/or which inlet is the next to open.

The actuator may be configured to vary a phase difference between the movement of the movable element and the rotation of the engine according to the opening of the engine inlets, such as according to which inlet is open and/or which inlet is the next to open.

The actuator may be configured to vary the position of the movable element and/or the frequency at which the position of the movable element is varied according to a distance between the chamber and the engine inlet that is being opened.

The chamber may be provided at a location substantially equidistant through the intake duct from a pair of the engine inlets. The intake duct may further comprise an inlet manifold configured to carry inlet gases to each of the cylinders. The chamber may be provide at one side of the inlet manifold. The chamber may be in fluid communication with the intake manifold. The chamber may be provided substantially centrally on the inlet manifold. The inlet manifold may comprise a first end and a second end, wherein the first end is closer to an air inlet of the intake system than the second end. The chamber may be in fluid communication with the inlet manifold at or near the second end.

The intake system may further comprise a cooler configured to cool the flow of inlet air within the inlet duct. The chamber may be provided downstream of the cooler. The chamber may be provided upstream of the cooler. The intake system may further comprise one or more additional chambers provided in fluid communication with the inlet duct. The additional chambers may comprise additional movable elements provided within the additional chambers. The additional chambers may comprise additional actuators configured to vary the positions of the additional movable elements. The additional actuators may be configured to vary the positions of the movable elements and thereby vary the volumes of the additional chambers. Any of the features described herein with reference to the chamber may apply equally to the additional chamber.

At least one of the additional chambers is provided upstream of the cooler. Additionally or alternatively, at least one of the additional chambers may be provided downstream of the cooler. The chamber and/or actuator may be configured to adjust a frequency of pressure waves within the inlet air. Additionally or alternatively, the chamber and/or actuator may be configured to generate pressure waves within the inlet air at a desired frequency.

The chamber and/or actuator may be configured such that a frequency of pressure waves within the inlet air substantially corresponds to a desired frequency at which the pressure waves provide enhanced induction for the engine.

For example, the chamber and/or actuator may be configured to adjust a frequency of existing pressure waves within the inlet air and/or to generate pressure waves at the desired frequency.

The chamber and/or actuator may be configured such that high pressure waves within the inlet air compress the inlet air within the cylinders e.g. when a corresponding engine inlet is open. The chamber and/or actuator may be configured such that the frequency of pressure waves within the inlet air is substantially equal to the second harmonic frequency of the engine running speed, e.g. twice the engine running speed.

The chamber and/or actuator may be configured such that gases within the chamber resonate at a frequency at which the pressure waves within the intake duct provide enhanced induction for the engine. The chamber and/or actuator may be configured to generate a pressure wave within the inlet duct at a frequency that is substantially equal to a desired frequency at which the pressure waves within the inlet duct provide enhanced induction for the engine.

According to another aspect of the present disclosure, there is provided a method of providing enhanced induction for an engine, the engine comprising an intake system comprising: an intake duct configured to carry inlet air to cylinders of the engine; a chamber provided to one side of the intake duct and in fluid communication with the intake duct; a movable element provided within the chamber; and an actuator configured to vary the position of the movable element and thereby vary a volume of the chamber able to receive inlet air from the intake system. The method for varying a volume of the chamber comprises: varying the position of the movable element at a frequency to adjust pressure variations within the intake system, wherein the frequency varies according to the rotational speed of the engine.

The position of the movable element may be varied such that a natural frequency of pressure variations within the intake duct may be substantially equal to a frequency at which the pressure variations may provide enhanced induction for the engine. Additionally or alternatively, the position of the movable element may be varied such that pressure variations may be generated within the intake duct at a frequency substantially equal to the frequency at which the pressure variations may provide enhanced induction for the engine.

The position of the movable element may varied such that pressure variations may be provided within the intake duct with a natural frequency substantially equal to the second harmonic frequency of the engine running speed.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for adjusting a frequency of vibration of a resonance system to vary the volume of an engine inlet manifold based on engine speed. Example embodiments of the engine system including an intake system and an exhaust system are shown in FIGS. 1-4. In each of the example embodiment the intake system further including one or more resonance systems to vary the volume of the intake system. An engine controller may be configured to perform a control routine, such as the example routine of FIG. 5, to vary the volume of the intake system by adjusting the resonance systems based on engine rotational speed.

Figure 1:
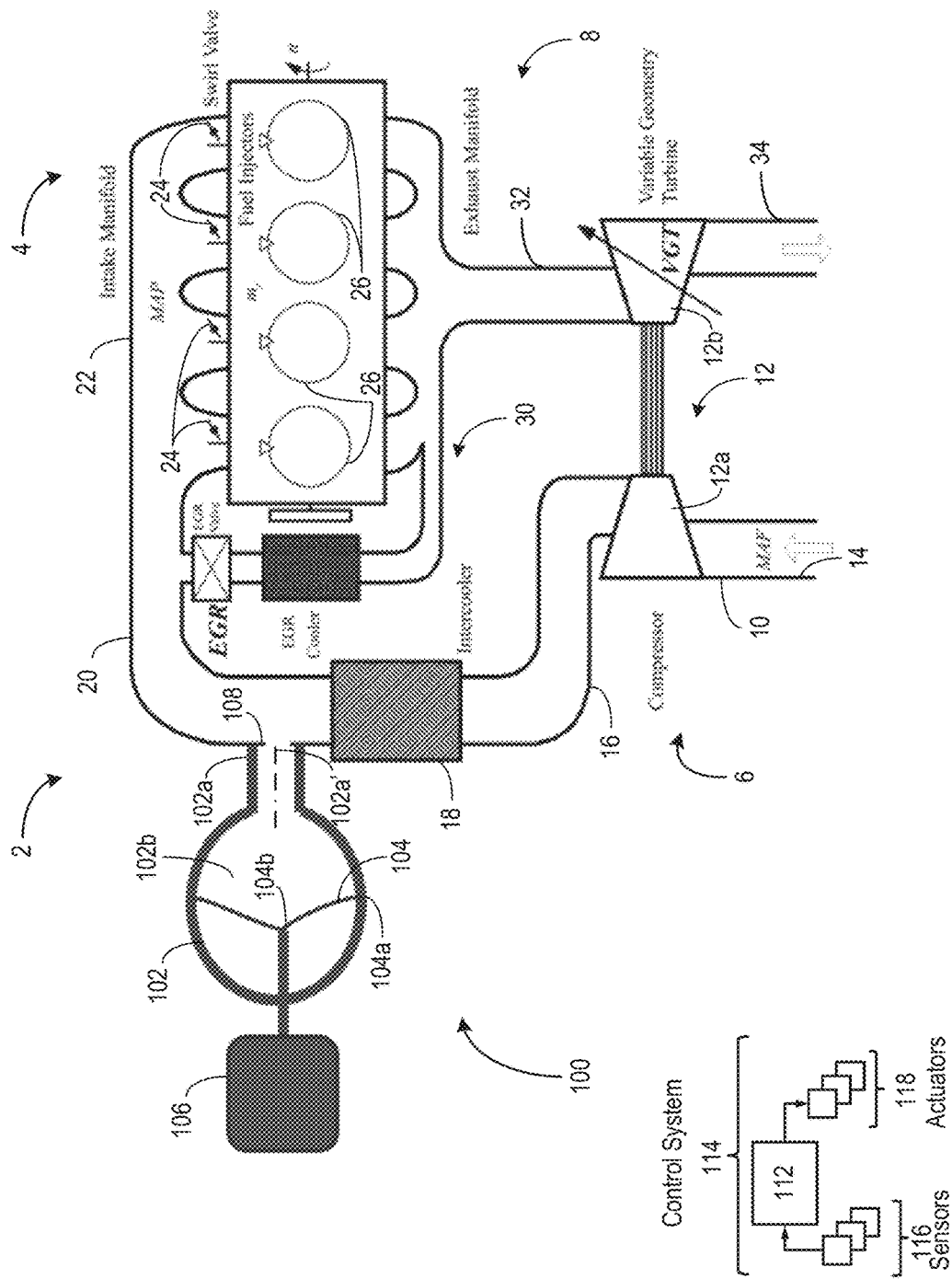
FIG. 1 is a schematic diagram of a first embodiment of an engine system for a motor vehicle, comprising an intake system, according to the present disclosure.

With reference to FIG. 1, an engine system 2 for a vehicle, such as a motor vehicle, comprises an engine 4, an intake system 6, an exhaust system 8 and a turbocharger 12.

Inlet air enters an intake duct 10 of the intake system 6 via an air inlet 14, before being compressed by a turbocharger compressor 12a. The turbocharger compressor 12a is driven by a turbocharger turbine 12b, which is provided on the same shaft as the turbocharger compressor 12a.

When the inlet air is compressed by the turbocharger compressor 12a, the temperature of the inlet air may be increased. The compressed inlet air leaving the turbocharger compressor 12a may enter a hot inlet duct 16. Delivering inlet air to the engine at an increased temperature may reduce the efficiency of the engine and may increase the amount of polluting substances produced by the engine. The intake system may therefore comprise an inlet cooler 18 configured to cool the inlet air within the hot inlet duct 16.

Inlet air passing though the inlet cooler 18 may enter a cold inlet duct 20. The cold inlet duct 20 may be configured to deliver the inlet air to an inlet manifold 22 of the engine 4. The engine 4 may comprise one or more inlet valves 24, which are opened selectively by the engine to allow air within the inlet manifold to be drawn into one or more cylinders 26 of the engine 4. Each cylinder 26 may correspond to one of the inlet valves 24. Alternatively, two or more inlet valves may correspond with one of the cylinders 26, such that air may be drawn into the cylinder via a plurality of inlet valves.

The inlet air may be drawn into the cylinders through the action of one or more pistons (not shown) provided within the cylinders 26. Additionally, the increased pressure of the inlet air provided by the turbocharger compressor 12a may act to force inlet air into the cylinders 26. The inlet air may be mixed with fuel within the cylinder 26, which is combusted in the presence of the inlet air to drive the piston of the cylinder. The piston in turn drives a crank shaft of the engine (not shown).

The gases produced through the combustion of the fuel and inlet air are exhausted from the engine via an exhaust manifold 28 and enter an exhaust duct 32 of the exhaust system 8.

The engine system 2 may further comprise an Exhaust Gas Recirculation (EGR) system 30. The EGR system 30 allows a portion of the exhaust gases to be recirculated back to the inlet of the engine 4. Replacing a portion of the oxygen rich air with burnt exhaust gases reduces the proportion of the contents of each cylinder that is available for combustion. This results in a lower heat release and lower peak cylinder temperature and thereby reduces the formation of $NO_X$.

As shown in FIG. 1, the EGR system 30 may comprise a high pressure EGR system configured to recirculate exhaust gases prior to the gases being expanded through the turbocharger turbine 12b. However, it is also envisaged that the EGR system 30 may comprise a low pressure EGR system, in which exhaust gases are recirculated, after being expanded through the turbocharger turbine, to a location upstream of the turbocharger compressor 12a. The engine system 2 may comprise a combination of low pressure and high pressure EGR systems. Alternatively, the vehicle may not comprise an EGR system.

The exhaust gases within the exhaust duct 32 are expanded through the turbocharger turbine 12b. Energy is extracted from the exhaust gases by the turbocharger turbine 12b in order to drive the turbocharger compressor 12a. The exhaust gases are then exhaust via an exhaust outlet 34.

As mentioned above, the inlet valves 24 are opened in order to allow inlet air to enter the engine cylinders 26. When one of the inlet valve 24 is open, air within the inlet duct may flow towards the inlet manifold. The inlet air flowing towards the inlet manifold has momentum and hence, when the inlet valve 24 closes (or the engine cylinder is fully charged with inlet air), the inlet air may continue to flow towards the inlet manifold. This flow of inlet air may lead to an increase in the pressure of inlet air within the inlet manifold, creating a higher pressure region of inlet air at or towards the inlet manifold. The increased pressure at the inlet manifold 22 may act to decrease the rate of inlet air flowing from the air inlet 14 to inlet manifold 22. As the flow rate reduces, the higher pressure region of the inlet air may propagate upstream towards the air inlet 14.

Inlet air downstream of the higher pressure region may flow at a lower flow velocity (in a direction towards the inlet manifold 22) than inlet air upstream of the higher pressure region. This may lead to the higher pressure region propagating further upstream and may lead to a lower pressure region being formed downstream of the higher pressure region. The lower pressure region may in turn act to increase the flow velocity of the inlet gases downstream of the higher pressure region, which may lead to the higher pressure region propagating back downstream towards the inlet manifold 22. The higher pressure region may oscillate upstream and downstream according to a natural frequency of the intake system 6.

The natural frequency of the intake system 6 may be determined by the geometry of the hot and/or cold inlet ducts 16, 20. The natural frequencies of the hot and cold inlet ducts may differ, and hence, multiple higher pressure regions may be present within the inlet ducts 16, 20, which may oscillate at different frequencies.

When providing the intake system 6, it is often desirable to tune to natural frequencies of the hot and/or cold inlet ducts 16, 20 such that the higher pressure region is located at the inlet manifold 22 when each the inlet valves 24 are open. This may enable inlet air within the cylinders 26 of the engine 4 to be charged to a higher pressure. Charging the inlet air to a higher pressure may improve the power and/or efficiency of the engine 4.

The opening and shutting of the inlet valves 24 may also produce pressure waves within the inlet gases, which propagate upstream towards the air inlet 14. As the pressure waves propagate through the inlet air, they may cause a pressure drop in the inlet air. For example, inlet air downstream of the pressure waves may be at a lower pressure than the inlet air upstream of the pressure waves. When the pressure waves reach a location on the inlet duct where the area of the duct changes, e.g. at the inlet cooler 18 and/or the turbocharger compressor 12a, the pressure waves may be at least partially reflected. As the reflected pressure waves propagate downstream, the pressure of the inlet air may be increased as the pressure waves pass through it. When the reflected pressure waves reach the inlet manifold 22 they may be reflected once again, and the process of propagation and reflection may be repeated. If one or more of the inlet valves 24 are open when the reflected pressure waves reaches the inlet manifold, the pressure waves may enter the corresponding cylinder 26 and may increase the pressure of the inlet gases within the cylinder, e.g. charging the inlet gases, before being reflected by the bottom of the cylinder.

When providing the intake system 6, it may be desirable to configure the hot and cold inlet ducts 16, 20 such that one or more pressure waves within the inlet gases reach the inlet valves 24 of the engine whilst the inlet valves 24 are open and charge the inlet air within the corresponding cylinder 26 to a higher pressure. It may also be desirable to configure the intake system 6 and/or the inlet valves 24, such that the inlet valves close before the pressure waves are reflected and propagate back out of the cylinder.

It will be appreciated that the frequency at which the inlet valves open and close is determined according to the running speed of the engine 4. Hence, if the geometry of each of the hot and cold inlet ducts 16, 20 of the intake system is constant, the intake system may only provide enhanced induction, e.g. increased pressure of inlet air within the engine cylinders, at a particular engine running speed or range of engine running speeds.

Figure 2:
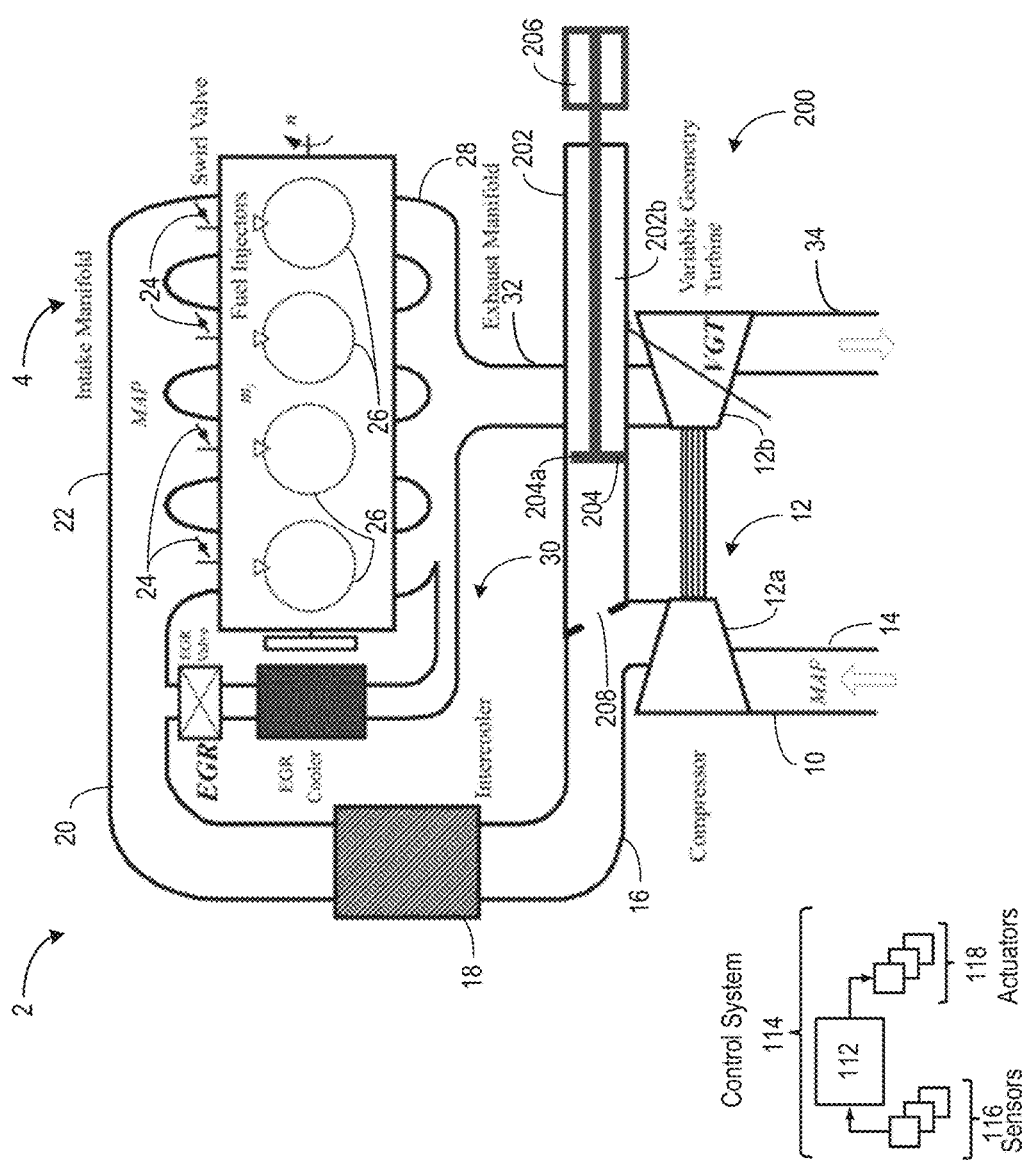
FIG. 2 is a schematic diagram of a second embodiment of an engine system for a motor vehicle, comprising an intake system, according to the present disclosure.
Figure 3:
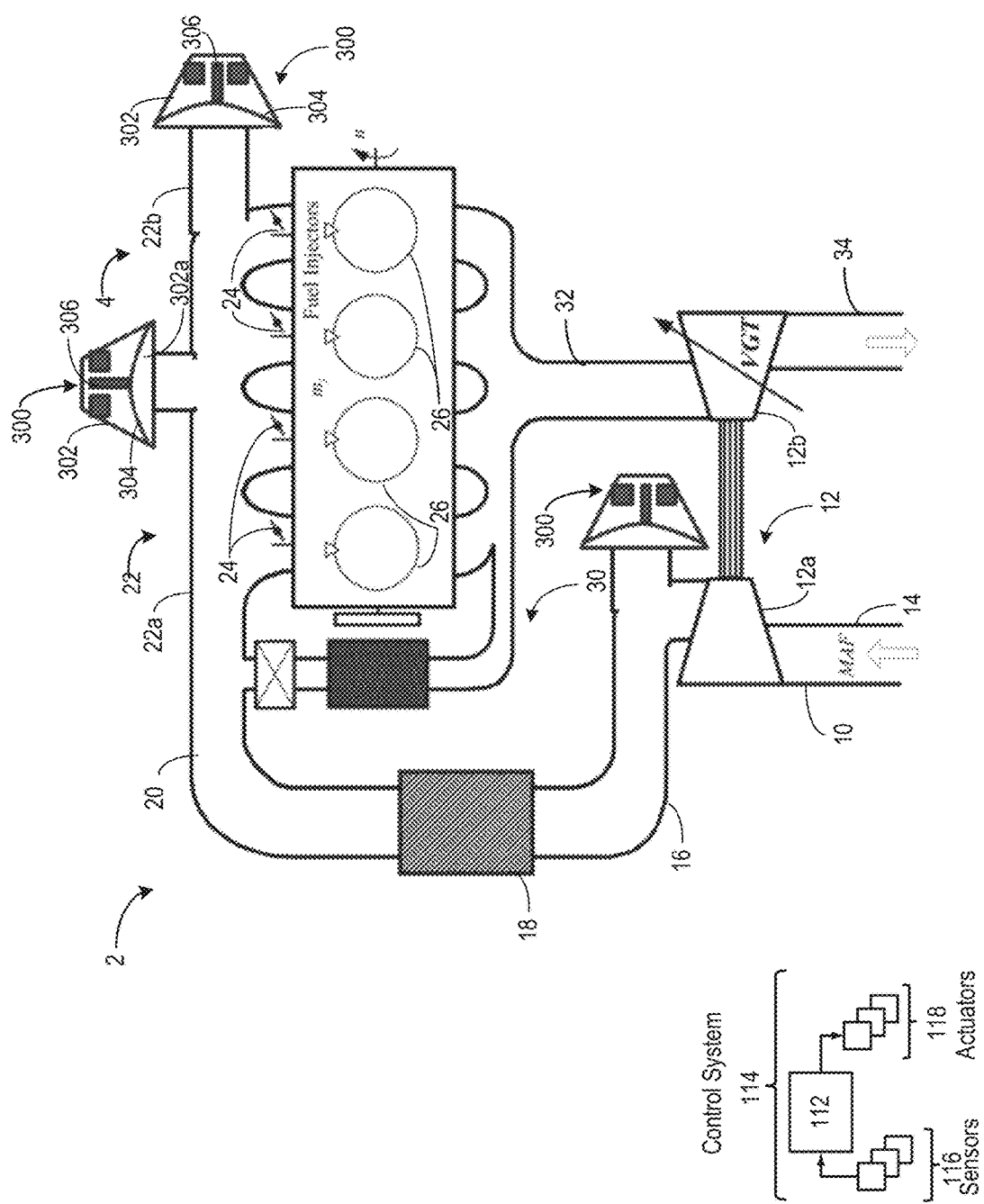
FIG. 3 is a schematic diagram of a third embodiment of an engine system for a motor vehicle, comprising an intake system, according to the present disclosure.

As shown in FIGS. 1, 2, and 3, in order to allow the intake system 6 to provide enhanced induction over a greater range of engine running speeds, the intake system 6 may comprise a resonance system 100, 200, 300, according to arrangements of the present disclosure.

With reference to FIG. 1, the resonance system 100 may comprise a chamber 102, a movable element 104 and an actuator 106. As shown in FIG. 1, the chamber 102 may be provided in fluid communication with the cold inlet duct 20. However, it is equally envisaged that the chamber 102 may be in fluid communication with the hot inlet duct 16 or the inlet manifold 22. The chamber may be provided next to, such as to one side of, the cold inlet duct 20.

The movable element 104 may be provided within the chamber 102. The position of the movable element 104 may be continuously variable and may be configured to move between a first position and a second position. The movable element may be substantially impermeable to air, and hence, when the movable element is moved from the first position to the second position, the volume of the chamber 102 able to receive inlet air from the intake system 6, e.g. from the cold inlet duct 20, may be varied.

The movable element 104 may be deformable. The movable element may be moved between the first position and the second position by deforming at least a portion of the movable element. For example, as shown in FIG. 1, an edge 104a of the movable element may be coupled to a wall of the chamber 102 and a central portion 104b of the movable element, e.g. a portion away from the edge, may be deformed in order to move the movable element between the first and second positions. The movable element 104 may be sealed against the wall of the chamber 102 at the edge 104a of the movable element to prevent inlet air passing through the movable element 104.

The actuator 106 may be coupled to the movable element 104, e.g. the central portion 104b of the movable element, and may be configured to move the movable element between the first and second positions. The actuator 106 and/or the movable element 104 may be configured such that the movable element 104 may be positioned at any point between the first and second positions, e.g. the position of the movable element 106 may be continuously variable between the first and second positions. Alternatively, movement of the actuator 106 and/or the movable element 104 may be stepped such that the movable element 104 may be positioned in one or more discrete locations between the first and second positions. Alternatively again, the actuator 106 and/or movable element 104 may be configured such that the movable element may only be positioned at either the first or the second position. The actuator 106 may be an electrical actuator. Alternatively, the actuator 106 may be a hydraulic or pneumatic actuator. Alternatively again, the actuator 106 may be any other form of actuator.

In the arrangement shown in FIG. 1, the chamber 102 comprises a neck portion 102a and a cavity portion 102b. As depicted, the cavity portion 102a may be substantially spherical. Alternatively, the cavity portion 102a may be any other shape. Such as cylindrical or conical, e.g. a conical frustum. The neck portion 102a may extend between the cavity portion 102b and the cold inlet duct 20, e.g. in a longitudinal direction of the neck portion 102a. The neck portion may be substantially circular in cross-section. Alternatively, the cross-section of the neck portion may be oval, rectangular, or any other shape. A central axis 102a' of the neck portion may extend along the length of the neck portion 102a, e.g. between the cavity portion 102a and the cold inlet duct 20, through a substantially central location of the cross-section of the neck portion 102a.

The cross-section of the neck portion may be substantially constant along the length of the neck portion 102a. Alternatively, the cross-section of the neck portion 102a may vary along the length of the neck portion, e.g. a cross-sectional area of the neck portion may increase or decrease along its length. The cross-sectional area, e.g. the maximum cross-sectional area of the neck portion 102a, may be smaller than a maximum cross-sectional area of the cavity portion 102b. For example, the diameter of the circular cross-section of the neck portion depicted in FIG. 1 may be less than the diameter of the sphere defining the cavity portion 102b.

The chamber 102 may be coupled to and in fluid communication with the cold inlet duct 20 via the neck portion 102a. The chamber 102 may be arranged such that the central axis of the neck portion 102a is at an angle to the cold inlet duct 20, e.g. relative to the flow of inlet air within the cold inlet duct 20. In other words, the neck portion 102a and/or the cold inlet duct 20, may be configured such that a component of the mainstream flow velocity within the cold inlet duct, at the location where the neck portion 102a meets the cold inlet duct 20, is perpendicular to the central axis of the neck portion 102a. For example, as shown in FIG. 1, the central axis of the neck portion may be arranged perpendicularly to the cold inlet duct 20.

An orifice 108 may be defined between the cold inlet duct 20 and the neck portion 102a, which controls, such as regulates, the flow of inlet air between the cold inlet duct 20 and the neck portion 102a. The diameter of the orifice may be smaller than the diameter of the neck portion 102a. The orifice, such as the opening of the orifice, may be parallel to the central axis of the neck portion 102a, such that a central axis of the orifice 108 may be parallel to (coincident with) the central axis of the neck portion 102a. Hence, the opening of the orifice may be arranged such that a component of the mainstream flow velocity within the cold inlet duct, at the location of the orifice, is perpendicular to the central axis of the neck portion 102a. In other words, the central axis of the orifice 108 may be arranged at an angle relative to the flow of inlet air within the cold inlet duct 20, such that the inlet air flows at least partially across the orifice 108.

The flow of inlet air and/or pressure variations within the cold inlet duct 20, such as those caused by the flow of inlet air into the engine cylinders 26, and/or the opening and/or closing of the inlet valves 24, may cause inlet air to flow into and out of the chamber 102. Similar to the intake system 6, the chamber 102 may have a resonant frequency. Pressure and/or flow variations within the cold inlet duct 20 may lead to pressure resonances within the chamber 102 at the resonant frequency of the chamber 102. Air resonating within the chamber 102 may lead to pressure variations being induced within the cold inlet duct, which may alter or override the existing pressure variations present in the cold inlet duct 20.

The resonant frequency of the chamber 102 may be affected by the volume of the chamber 102, e.g. the volume of the cavity portion 102b, and hence, by moving the movable element 104 between the first and second positions, the resonant frequency of the chamber 102 may be adjusted. Adjusting the resonant frequency of the chamber 102 may affect the overall resonant frequency of the intake system 6. The movable element 104 may be adjusted to set the resonant frequency of the intake system 6 in order to provide enhanced induction for the engine 4 through the mechanisms described above. For example, the resonant frequency of the intake system 6 may be adjusted such that the higher pressure region of the inlet air may be located at the inlet manifold when the inlet valves 24 are open at substantially all engine running speeds. For example, at a certain rotational speed of the engine, a volume of the chamber 102 may be adjusted by varying the position of the movable element 104 at a frequency proportional to the rotational speed of the engine.

Additionally or alternatively, resonating air within the chamber 102 may produce pressure waves and/or may alter the frequency of pressure waves within the inlet air, which are caused by the opening and/or closing of the inlet valves 24. The movable element 104 may be configured such that the resonating air within the chamber 102 cause pressure waves within the inlet air to reach the inlet valves 24 whilst the inlet valves 24 are open, thereby increasing the pressure of inlet air within the engine cylinders 26 and providing enhanced induction.

As shown in FIG. 1, the engine may comprise four cylinder 26, hence it may be desirable to adjust the natural frequency of the intake system to be substantially equal to the second harmonic frequency of the engine, such as twice the running speed of the engine. The desirable natural frequency of the intake system may depend of the configuration of the engine 4 and/or the inlet valves 24.

Engine system 2 may further include control system 114. Control system 114 is shown receiving information from a plurality of sensors 116 (various examples of which are described herein) and sending control signals to a plurality of actuators 118 (various examples of which are described herein). As one example, sensors 16 may include manifold air pressure sensor, exhaust temperature sensor, exhaust pressure sensor, compressor inlet temperature sensor, compressor inlet pressure sensor, compressor inlet humidity sensor, crankshaft position sensor, and engine coolant temperature sensor. Other sensors such as additional pressure, temperature, air/fuel ratio, and composition sensors may be coupled to various locations in engine system 2. The actuators 118 may include, for example, throttle, intake valve 24, actuator 106 of the resonance system 100, EGR valve, and fuel injector. The control system 14 may include a controller 12. The controller 12 may receive input data from the various sensors, process the input data, and trigger various actuators in response to the processed input data based on instruction or code programmed therein corresponding to one or more routines. In one example, based on engine rotational speed as inferred via the crankshaft position sensor, the controller 12 may send a signal to the actuator 106 of the resonance system 100 to adjust the position of the movable element 104 of the resonance system 100 at a frequency proportional to the rotational speed of the engine.

An alternate embodiment of the engine system of FIG. 1 is shown in FIG. 2 and elaborated below with reference to example resonance system 200. All components of the engine system 2 in FIG. 2 may be identical to that of engine system 2 in FIG. 1 other than the resonance system 200. Components previously introduced in FIG. 1 are numbered similarly and not reintroduced. Similar to the embodiment of FIG. 1, engine system 2 of FIG. 2 may further include control system 114 for controlling engine operations.

With reference to FIG. 2, a chamber 202 of a resonance system 200 in a second embodiment of the engine system 2 may be provided in fluid communication with the hot inlet duct 16. As shown in FIG. 2, the chamber 202 may not comprise a neck portion. However, an orifice 208 may optionally be provided, which controls and/or regulates the flow of inlet air into and/or out of the chamber 202. In the arrangement shown in FIG. 2, the orifice may form the neck portion. A cavity portion 202b of the chamber 202 may be substantially cylindrical. The central axis of the chamber 202 may be in line with a portion of the cold inlet duct 16. A central axis of the orifice 208 may be provided at an angle relative to a central axis of the chamber 202, e.g. a central axis of the cylindrical cavity 202b. As described above with reference to FIG. 1, the opening of the orifice 208 may be provided at an angle relative to the flow of inlet air within the inlet duct, such that the inlet air flows at least partially across the orifice 208, e.g. a component of the velocity of the mainstream inlet air at the location of the orifice may be perpendicular to the central axis of the orifice.

A movable element 204 may be provided within the chamber 202. The movable element may be a substantially circular disc. The movable element 204 may be rigid. An edge portion 204a of the movable element may be configured to sealingly engage the wall, such that inlet air is prevented from passing between the movable element and the wall of the chamber 202. The movable element 204 may be configured to move parallel to a central axis of the cylindrical cavity 202b to vary the volume of the chamber 202, e.g. the movable element may form a piston provided within the cylindrical cavity 202b of the chamber.

The resonance system 200 further comprises an actuator 206 configured to move the movable element 204 between a first position at which the volume of the chamber 202 is at a maximum value, to a second position at which the volume of the chamber 202 is at a minimum value. In one example, the position of the movable element 204 may be continuously variable between the first and second positons. In another example, the movable element 204 may be positioned in one or more discrete locations between the first and second positions. In yet another example, the element 204 may be configured such that the movable element may only be positioned at either the first or the second position.

The resonance system 200 may be configured to perform similarly to the resonance system 100 to alter and/or generate pressure variations within the hot inlet duct to provide enhanced induction for the engine. As such, based on engine rotational speed as inferred via the crankshaft position sensor, the controller 12 may send a signal to the actuator 206 of the resonance system 200 to adjust the position of the movable element 204 of the resonance system 200 at a frequency proportional to the rotational speed of the engine.

Although the resonance system 100, shown in FIG. 1, is provided on the cold inlet duct 20, and the resonance system 200 is provided on the hot inlet duct 16, it is equally envisage that the resonance system 100 may be provided on the hot inlet duct 16 and/or the resonance system 200 may be provided on the cold inlet duct 20 in addition or as an alternative to the resonance systems 100, 200 depicted in FIGS. 1 and 2. More than one resonance system 100, 200 may be provided on the hot inlet duct 16 and/or the cold inlet duct 20.

As described above, the movable elements 104, 204 of the resonance systems 100, 200 may be configured to adjust the volumes of the chambers 102, 202 of the resonance systems to alter the resonant frequencies of the resonance systems. The resonance systems 100, 200 make use of the resonance of inlet air within the chambers 102, 202 to affect the natural frequency of the intake system 6 and/or to provide pressure variations, e.g. pressure waves, within the inlet air at a desired frequency. The position of the movable element 104, 204 may therefore be varied when the rotational speed of the engine varies, altering the natural frequency of the intake system 6 and continuing to provide enhanced induction to the engine 4. However, when the speed of the engine is constant, the movable elements 104, 204 may not be required to move and enhanced induction may be provided passively by the resonance systems 100, 200. The resonance systems 100 may therefore be passive resonance systems.

An alternate embodiment of the engine system of FIG. 1 is shown in FIG. 3 and elaborated below with reference to example resonance system 300. All components of the engine system 2 in FIG. 3 may be identical to that of engine system 2 in FIG. 1 other than the resonance system 300. Components previously introduced in FIG. 1 are numbered similarly and not reintroduced. Similar to the embodiment of FIG. 1, engine system 2 of FIG. 3 may further include control system 114 for controlling engine operations.

The resonance system 300 may be configured to implement forced vibration of the inlet air in order to provide enhanced induction for the engine 4.

As shown in FIG. 3, the resonance system 300 comprises a chamber 302, a movable element 304 and an actuator 306. The chamber 302 may comprise a cavity 302a, which may be shaped as a conical frustum.

The actuator 306 may be configured to move, e.g. oscillate, reciprocate or vibrate, the movable element 304 at a desired frequency in order to produce pressure variations in the inlet air within the cavity 302a. The desired frequency may be determined in order to cause pressure waves within the hot and/or cold inlet duct 16, 20, which provide enhanced induction for the engine 4. As an example, the desired frequency may be determined such that the pressure waves reach the inlet manifold 22 when one or more of the inlet valves 24 are open and the pressure waves may enter the corresponding cylinder 26 and may increase the pressure of the inlet gases within the cylinder thereby charging the inlet gases, before being reflected by the bottom of the cylinder.

As described above, the desired frequency may vary according to the engine running frequency. Hence, the frequency at which the actuator 306 moves the movable element 304 may vary according to the engine running speed. Unlike the resonance systems 100, 200 described above, the position of the movable element 304 of the resonance system 300 may be varied by the actuator 306 even when the engine running speed is substantially constant, in order to generate pressure variations. During engine combusting operation at a substantially constant rotational speed, the frequency of vibration of the movable element 304 may be adjusted to generate pressure waves in the intake system. As an example, the engine speed may be with 5% of the average engine speed. In this way, the resonance system 300 may be an active resonance system.

As depicted in FIG. 3, the chamber 302 may be provided on the inlet manifold 22, e.g. in fluid communication with the inlet manifold. The inlet manifold 22 may have a first end 22a and a second end 22b. The first end 22a may be closer to the engine inlet 14 (through the cold and hot inlet ducts 20, 16). The chamber 302 may be provided between the first and second ends 22a, 22b of the inlet manifold, e.g. substantially centrally between the first and second ends 22a, 22b. Alternatively, the chamber 302 may be provided at or towards an end of the inlet manifold. For example, as shown in FIG. 3, the chamber may be provided at the second end 22b.

A plurality of resonance systems 300 may be provided within the intake system 6. For example, as shown in FIG. 3, one resonance system may be provided on the hot inlet duct 16 and two resonance system 300 may be provided on the inlet manifold 22. Alternatively, two or more resonance systems 300 may be provided on the hot inlet duct 16 and/or one or more than two resonance systems 300 may be provided on the inlet manifold 22. In another arrangement (not shown) one, two or more than two resonance systems 300 may be provided on the cold inlet duct 20.

The chamber 302, of one or more of the resonance systems 300, may be provided at a location, such as location A, which is between (such as equidistant from) a pair of the inlet valves 24 through the inlet manifold. Alternatively, the chamber 302 may be provided at a location B, which is a different distance from each of the inlet valves 24. When the chamber 302 is provided a different distance from each of the inlet valves 24, the desirable frequency of pressure waves produced by the resonance system 300 in order to provide enhanced induction for the engine may vary according to which of the inlet valves is open. Hence, the actuator 306 may be configured to vary the frequency at which the movable element is moved according to the opening of the inlet valves 24, e.g. according to which inlet valve is open, is next to open, and/or will be open when the pressure wave being generated within the chamber 302 reach the inlet valves 24.

Additionally or alternatively, it may be desirable to adjust the phase of the vibrations of the movable element 304 relative to the rotation of the engine according to the opening of the inlet valves 24, such as according to which inlet valve is open, will be the next to open, and/or will be open when the pressure waves being generated within the chamber 302 reach the inlet valves 24.

A method for providing enhanced induction for an engine, the engine comprising an intake system 6 according to the present disclosure, may comprise varying the position of the movable element 104, 204, 304 in order to adjust a frequency of pressure variations within the intake system to provide enhanced induction to the engine. As an example, by adjusting the frequency of pressure variations in the intake system, a higher pressure region may be positioned at the inlet manifold 22 during the opening of each of intake valves 24 thereby enabling inlet air within the cylinders 26 of the engine 4 to be charged to a higher pressure. Charging the inlet air to a higher pressure may improve the power and/or efficiency of the engine 4.

As described above, the intake system may comprise a passive resonance system, and the position of the movable element may be determined according to the engine running speed. The natural frequency of pressure variations within the resonance system may affect the natural frequency of pressure variations within the intake systems 6. Hence, the position of the movable element may be determined such that the natural frequency of pressure variations within the intake duct are substantially equal to a frequency at which the pressure variations provide enhanced induction for the engine. Additionally or alternatively, the position of the movable element may be varied such that pressure variations may be generated within the intake duct at a frequency substantially equal to the frequency at which the pressure variations provide enhanced induction for the engine. For example, for an engine comprising four cylinders, the frequency may be twice the engine running speed, such as the second harmonic of the engine running speed. As described above, such pressure variations may be generated using an active or passive resonance system. If the resonance system comprises an active resonance system, the method may comprise determining a frequency at which to vary the position of the movable element, according to the running speed of the engine. In this way, the systems of FIG. 3 provide for an engine system comprising a crankshaft position sensor, an intake system including an air inlet, an intake compressor, a hot inlet duct, a cooler, and a cold inlet duct leading to an inlet manifold, one or more inlet valves coupled to the inlet manifold regulating entry of air into one or more engine cylinders, one or more resonant systems fluidically coupled to the intake system to regulate frequency of pressure waves in the intake system, each resonant system comprising a movable element positioned within a chamber creating a cavity in the chamber, an actuator to vibrate the movable element within the chamber, and an orifice allowing a flow of air both into and out of the chamber, and a controller with computer readable instructions stored on non-transitory memory for: in response to a change in a rotational speed of the engine, varying a frequency of vibration of the movable element to generate pressure waves in the inlet manifold, wherein a frequency of the pressure waves generated in the intake system is equal to the second harmonic frequency of the rotational speed of the engine. Also, adjusting the frequency of vibration of the movable element may be based on a timing of opening and a sequence of opening of the one or more inlet valves such that to position the pressure waves at the inlet manifold when each one of the one or more inlet valves open.

Figure 4:
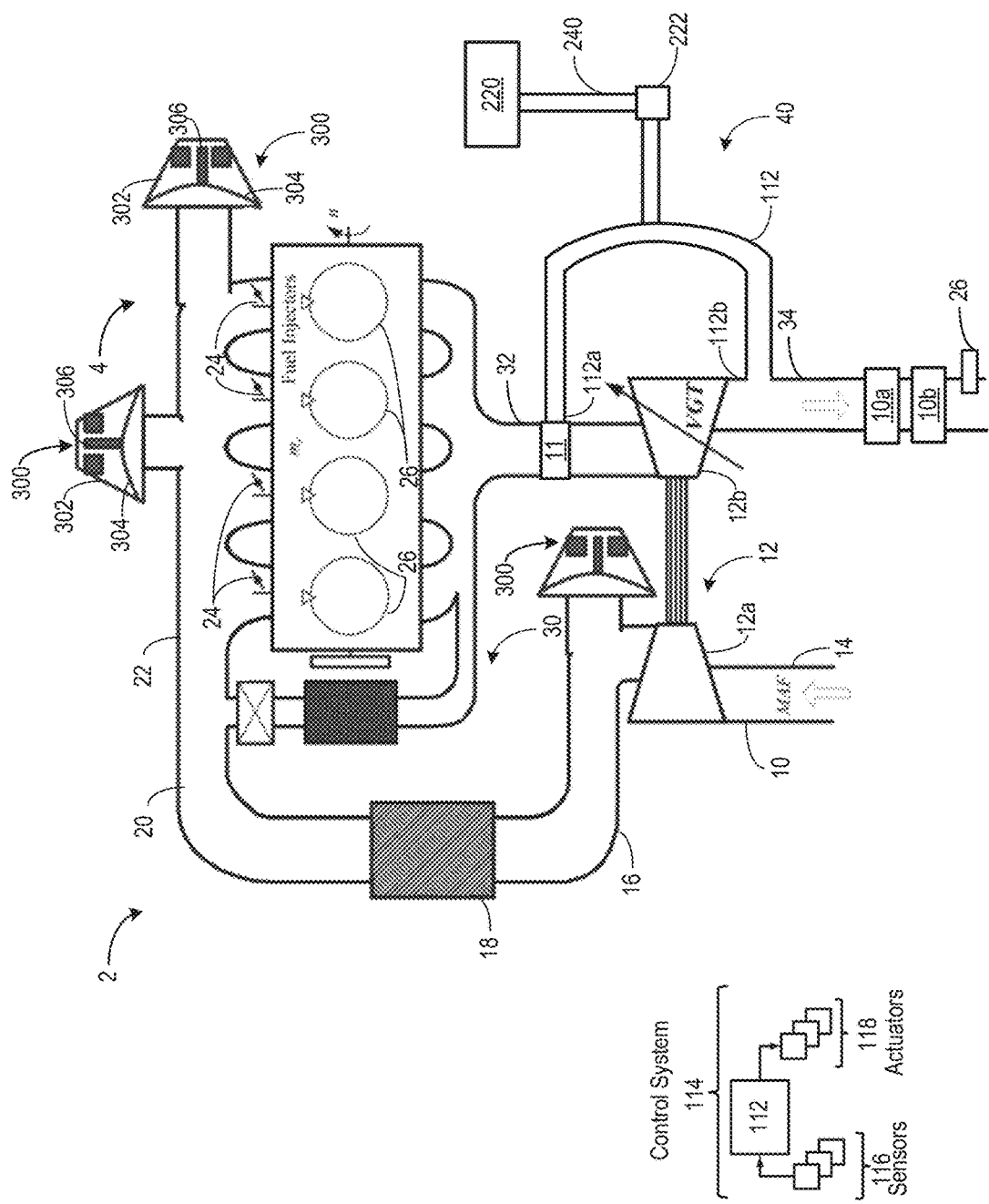
FIG. 4 is a schematic diagram of a fourth embodiment of an engine system for a motor vehicle, comprising an intake system and an exhaust system, according to the present disclosure.

An alternate embodiment of the engine system of FIG. 3 is shown in FIG. 4 and elaborated below with reference to example exhaust system 40. All components of the engine system 2 in FIG. 4 may be identical to that of engine system 2 in FIG. 3 other than the exhaust system 40. Components previously introduced in FIG. 3 are numbered similarly and not reintroduced. Similar to the embodiment of FIG. 3, engine system 2 of FIG. 4 may further include control system 114 for controlling engine operations.

As shown in FIG. 4, the exhaust system 40 further comprises a turbocharger bypass duct 112. The turbocharger bypass duct is fluidly coupled, at a first end 112a, to the high pressure portion of the exhaust duct 32 (at a position on the exhaust duct 32 upstream of the turbocharger turbine 12b). The turbocharger bypass duct 112 is fluidly coupled, at a second end 112b, to the low pressure portion of the exhaust duct 32, (at a position on the exhaust duct 32 downstream of the turbocharger turbine 12b). The turbocharger bypass duct allows a portion of the exhaust gases to bypass the turbocharger turbine 12b.

A turbocharger bypass valve 11 may be provided to control the proportion of the exhaust gases which flow though the turbocharger turbine and/or the turbocharger bypass duct 112. Control of the exhaust gases in this way allows the level of boost provided by the turbocharger to be controlled. The turbocharger bypass valve 11 may be provided on the exhaust duct 32 and may be configured to control the flow of exhaust gases through the turbocharger turbine 12b directly and through the turbocharger bypass duct 112 directly.

When the bypassed exhaust gases leave the bypass duct 112, downstream of the second end 112b, the bypassed exhaust gases may mix with the bulk flow of exhaust gases exiting the turbine 12b. Alternatively, due to the relative flow properties, such as the pressures, velocities and/or flow regimes, of the bulk exhaust flow and the bypassed exhaust flow, the exhaust gases may not mix downstream of the second end 12b before reaching the LNT 10a and/or the SCR device 10b. In either case, both the bulk flow of exhaust gases and the bypassed exhaust gases may pass through the LNT 10a and the SCR device 10b.

The LNT 10a typically contains a zeolite catalyst, which enables $NO_X$ compounds (particularly NO and $NO_2$) to be adsorbed from the exhaust gases. In order to purge the LNT 10a, the engine may be operated under rich combustion conditions, which may lead to the generation of an increased concentration of reducing substances within the exhaust gases, such as unburnt hydrocarbons (HC). The engine may also be controlled to increase the temperature of the exhaust gases. The increased concentration of reducing substances and high temperature may lead to the captured $NO_X$ being converted into nitrogen and water, which can be exhausted from the vehicle.

In use, the LNT 10a may also capture $SO_X$ from the exhaust gases. The captured $SO_X$ may also be stored in the zeolite catalyst. Storage of the $SO_X$ may reduce the availability of the catalyst to store $NO_X$. Hence, as the amount of $SO_X$ stored within the zeolite increases, it may be necessary to increase the frequency with which the LNT 10a is purged. In order to reduce the amount of $SO_X$ stored in the catalyst it may be desirable to perform a desulfurisation ($DeSO_X$) procedure. The $DeSO_X$ procedure may also comprise operating the engine under rich combustion conditions with an increased exhaust gas temperature; however, in order to remove the stored $SO_X$, it may be necessary for the LNT 10a to be heated to higher temperatures than during a purge event.

The SCR device 10b, in the exhaust system depicted in FIG. 1, comprises a catalyst configured to catalyse a reduction reaction to lower the concentration of polluting substances, such as $NO_X$, within the exhaust gas. A reductant is typically injected upstream of the SCR device, for example by an SCR dosing system (not shown), which reacts with the exhaust gases in the presence of the SCR catalyst. For example, $NO_X$ may be reduced by the reductant into nitrogen gas and water vapour. In a typical SCR device anhydrous ammonia is used as the reductant. The dosage of reductant can be controlled to determine the efficiency at which $NO_X$ is removed from the exhaust gases.

Once the exhaust gases have passed though the LNT 10a and the SCR 10b, they may be exhausted from the vehicle via the exhaust outlet 34. An outlet emissions sensor 16, such as a $NO_X$ sensor, may be coupled to the outlet 34 to determine the emissions being produced by the vehicle. The emissions values recorded by the emissions sensor 16 may be used to together with a measurement from an engine emissions sensor 18 to determine the efficiency with which the LNT 10a and the SCR 10b are operating to remove pollutants from the exhaust gases. The determined efficiency may be used to determine the amount of reductant to be added to the SCR device 10b and/or when the LNT 10a should be purged.

The vehicle 1 further comprises a hydrogen source 220. The hydrogen source 220 may comprise a reservoir configured to store hydrogen, which can be refilled as required, e.g. when depleted. Additionally or alternatively, the hydrogen source 20 may comprise a hydrogen generator configured to generate hydrogen through electrolysis, reformation or any other suitable process. Hydrogen may be generated during operation of the vehicle when it is required for use by systems of the vehicle.

An injector 222 is provided on the turbocharger bypass duct 112 and is configured to introduce hydrogen into the bypass duct. The injector may be fluidly coupled to the hydrogen source 210, via a hydrogen duct 240, such that hydrogen may be selectively introduced into the turbocharger bypass duct 112 from the hydrogen source 210. The injector may be controllable to selectively vary the pressure at which hydrogen is introduced into the bypass duct. Hydrogen gas, which is introduced into the turbocharger bypass duct 112 may flow within the exhaust gases to reach the LNT 10a and/or the SCR device 10b. Hydrogen reaching the SCR device 10b may act as a reductant, and may react with substances in the exhaust, such as $NO_X$, in the presence of the SCR catalyst or another catalyst provided in the SCR device 10b. The reaction between the hydrogen and the exhaust gases may proceed at a lower temperature than the reaction between ammonia and the exhaust gases and hence by utilising hydrogen as a reductant in the SCR device 10b, it is possible to reduce the concentrations of polluting substances, such as $NO_X$, at a lower temperature. Additionally or alternatively, hydrogen may react with oxygen within the SCR device 10b to increase the temperature of the exhaust gases and/or the SCR device 10b. The SCR device may therefore reach a temperature at which ammonia may be used effectively as a reductant at an earlier point, e.g. time, in the drive cycle.

As mentioned above, it may also be necessary to perform the $DeSO_X$ procedure in order to remove $SO_X$, which has been stored within the zeolite catalyst. Introducing hydrogen during DeSO$_X$ may improve the efficiency of the DeSO$_X$ procedure. Hydrogen may diffuse more deeply and/or more rapidly into the zeolite catalyst, which may lead to an increased rate of SO$_X$ removal. Additionally or alternatively, when introducing hydrogen it may be possible to perform the DeSO$_X$ procedure at lower temperatures and with the engine being operated under less rich conditions.

When hydrogen is injected into the turbocharger bypass duct 112, the hydrogen may initially mix with a controlled portion of the exhaust gases within the turbocharger bypass duct 112 before entering the bulk flow of exhaust gases within the exhaust duct 34. Mixing of the hydrogen with a limited portion of the exhaust gases may be beneficial, as it prevents excessive dilution of the hydrogen and/or oxidation of the hydrogen by the exhaust gases.

Controlling the relative pressures of the hydrogen, the bypassed exhaust gases and/or the bulk exhaust flow allows the dispersion of hydrogen within the exhaust gases at the LNT 10a and/or SCR 10b to be controlled. Furthermore, exhaust gases passing through the turbocharger bypass duct 112 may be less turbulent than the bulk exhaust flow. The less turbulent nature of the bypass flow, may limit diffusion of the hydrogen within the bulk gases. The rate of diffusion and/or mixing of the hydrogen may also be affected by the relative flow properties, e.g. pressure, velocity and/or flow regime, of the two flows of exhaust gases (the bypassed exhaust gases and hydrogen, and the bulk exhaust flow). Limiting the rate of the diffusion of hydrogen may reduce the rate of oxidation of the hydrogen and may increase its efficacy in improving the performance of the LNT 10a and/or the SCR device 10b, as described above.

Figure 5:
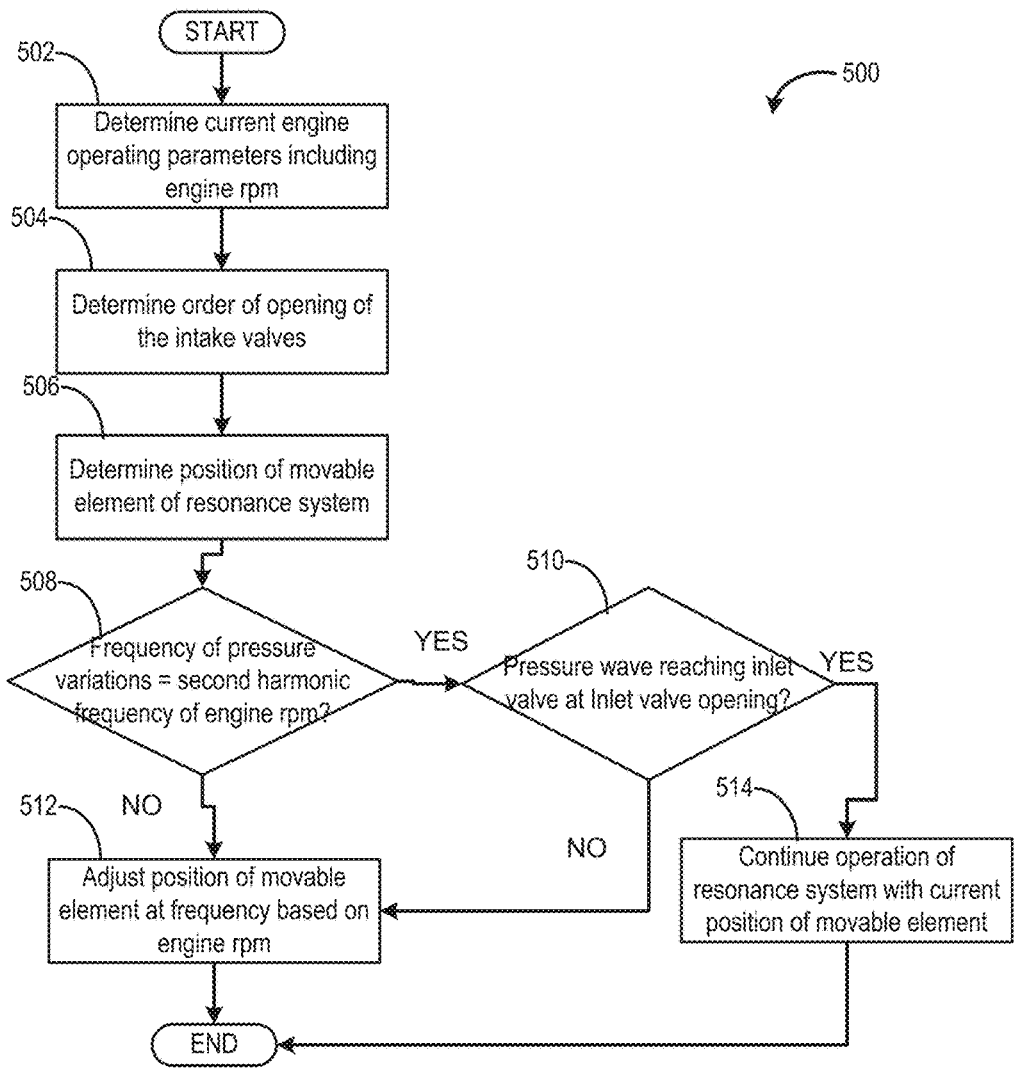
FIG. 5 shows a flow chart illustrating an example method that may be implemented for adjusting the volume of an intake system based on the rotational speed of the engine.

FIG. 5 illustrates a first example method 500 that may be implemented for adjusting the volume of an intake system of FIGS. 1-2 and the frequency of vibration of the resonance system of FIG. 3 based on engine speed. Instructions for carrying out method 500 and the rest of the methods included herein may be executed by a controller based on instructions stored on a memory of the controller and in conjunction with signals received from sensors of the engine system, such as the sensors described above with reference to FIGS. 1-4. The controller may employ engine actuators of the engine system to adjust engine operation, according to the methods described below.

At 502, the routine includes estimating and/or measuring engine operating parameters. Parameters assessed may include, for example, engine speed (rotational speed in rpm), engine temperature, engine load, exhaust temperature. Also ambient conditions including ambient temperature, pressure, and humidity, manifold pressure and temperature, boost pressure, exhaust air/fuel ratio, etc. may be estimated.

At 504, the order of opening of the intake valves may be determined based on engine operating parameters such as engine speed and engine load. In one example, the controller may refer to a look-up table having the engine speed and load as the input, and having a schedule for opening of each of the intake valves corresponding to each of the engine cylinders as the output. In another example, the controller may rely on a model that correlates the change in engine speed with a change in the frequency of intake valve opening, and further correlates the frequency of intake valve opening to a change in intake valve timing.

At 506, the current position of the movable element (such as movable element 104 and 204 in FIGS. 1 and 2 respectively) of the resonance system(s) (such as resonance system 100 and 200 in FIGS. 1 and 2 respectively) may be estimated based on each of the frequency of pressure variations in the intake system and engine speed as estimated via the manifold air pressure sensor and the crankshaft position sensor, respectively. For certain resonance systems (such as the resonance system 300 as shown in FIG. 3), the controller may similarly determine the current frequency of oscillation or vibration of the movable element based on each of the frequency of pressure variations in the intake system and engine speed. The controller may estimate the volume of the intake system from the frequency of pressure variations in the intake system and engine speed and from thereon estimate the current position of the movable element. In one example, the controller may determine the current position of the movable element based on a calculation using a look-up table with the input being the frequency of pressure vibrations in the intake system and engine speed and the output being the position of the movable element. Similarly, the controller may determine the frequency of vibration of the movable element based on a calculation using a look-up table with the input being the frequency of pressure vibrations in the intake system and engine speed and the output being the frequency of vibration of the movable element. Also, the controller may make a logical determination (such as regarding the position of the movable element and/or the frequency of vibration of the movable element) based on logic rules that are a function of parameters including frequency of pressure vibrations in the intake system and engine speed.

At 508, the routine includes determining if the frequency of pressure variations in the intake system is substantially equal to a determined second harmonic frequency of the engine speed. By adjusting the frequency of pressure variations in the intake system to be substantially equal to the determined second harmonic frequency of the engine speed of a four cylinder engine, it is possible to position the higher pressure region in the intake system at the inlet manifold when each of the inlet valves open. Due to the presence of the higher pressure region at the time of opening of an inlet valve, pressurized air may enter the respective cylinder and the air within the cylinder may be charged to a higher pressure. By charging the inlet air within each cylinder, engine power output and efficiency may be increased. The routine may also compare the frequency of pressure variations in the intake system to a resonant frequency of the intake system such that the higher pressure region of the inlet air may be located at the inlet manifold when each of the inlet valves open, thereby allowing the air within each of the cylinders to be charged to a higher pressure.

If it is determined that the frequency of pressure variations in the intake system is substantially equal to the determined second harmonic frequency of the engine speed, at 510, the routine includes determining if the pressure waves created in the intake system due to opening and closing of the inlet vales are reaching the inlet valves (in the inlet manifold) at the time of opening of each of the valves. The pressure waves may travel back and forth through the intake system as they may be reflected at the inlet manifold and then again at the intake system cooler. If at the time of opening of an inlet valve, the pressure waves are present at the location of the inlet valve, the pressurized air may enter the cylinder (corresponding to the open inlet valve) and the air within the cylinder may be charged to a higher pressure. By charging the inlet air within each cylinder, engine power output and efficiency may be increased.

If it is confirmed that at the current configuration of the resonance system(s) of the intake system, the pressure waves are reaching the inlet valves at the time of opening of each of the inlet valves, at 514, the operation of the resonance system(s) may be continued with the current position of the movable element(s). In one example, the resonance system (such as the resonance system as shown in FIG. 3) may be continued to be oscillated or vibrated at the current frequency.

If it is determined that the frequency of pressure vibrations in the intake system is not substantially equal to the second harmonic frequency of engine speed and/or the pressure waves are not reaching the inlet valves at the time of opening of each of the inlet valves, it may be inferred that the position of the movable elements of the resonance systems and/or the frequency of vibration of the movable element of the resonance systems need to be adjusted.

At 512, the position of the movable element may be adjusted based on engine speed. The controller of the resonance system may vary the position of the movable element at a frequency which is a function of the engine speed. In one example, the frequency at which the position of the movable element is varied may be increased with an increase in engine speed such that the frequency of pressure variations become substantially equal to the frequency of engine speed. In addition, the position of the movable element and the frequency at which the position of the movable element varies may be adjusted according to an opening schedule of the engine inlets such that when each of the engine inlets open, air within the cylinder may be charged to a higher pressure due to the presence of the higher pressure at the location of the inlet valve. Also, the actuators coupled to the movable elements may vary a phase difference between the movements of the movable elements relative to the engine rpm, according to the opening of the engine inlets. Further, the actuators coupled to the movable elements may vary each of the position of the movable elements and/or the frequency at which the positions of the movable elements are varied based on a distance between the chamber and the engine inlet valve that is being opened. The frequency of vibration or oscillation of a movable element may be adjusted based on engine speed and timing of inlet valve opening. On one example, when the frequency of pressure waves generated in the intake system is higher the determined second harmonic frequency of engine speed, the frequency of vibration of the movable element may be decreased until the frequency of pressure waves generated in the intake system is equal to the determined second harmonic frequency of the engine speed. Similarly, when the frequency of pressure waves generated in the intake system is lower the determined second harmonic frequency of engine speed, the frequency of vibration of the movable element may be increased until the frequency of pressure waves generated in the intake system is equal to the determined second harmonic frequency of the engine speed. The frequency of vibration of the movable element is may be further adjusted based on each of a timing of opening and a sequence of opening of a plurality of inlet valves supplying air to the plurality of engine cylinders, the frequency of vibration adjusted to position the pressure waves at a location of the one or more inlet valves when one of the plurality of the inlet valves is opened. A phase difference between a movement of the movable element and the engine speed may be varied based on each of the timing of opening and the sequence of opening of the plurality of inlet valves. Also, the frequency of vibration of the movable element may be adjusted based on a distance between the resonance system and one of the plurality of the inlet valves that is open. In one example, the phase difference may be increased and also the frequency of vibration of the movable element may be increased when the inlet valve farthest from the resonance system is being opened. In another example, the phase difference may be decreased and also the frequency of vibration of the movable element may be decreased when the inlet valve closest from the resonance system is being opened.

In this way, a frequency of vibration of a movable element provided within a cavity of a resonance system may be adjusted based on an engine speed; the resonance system fluidically coupled to an engine intake system supplying intake air to each of a plurality engine cylinders.

An example engine system comprises: an intake duct configured to carry inlet air to cylinders of the engine, a chamber provided to one side of the intake duct and in fluid communication with the intake duct, a movable element provided within the chamber, and an actuator configured to vary a position of the movable element and thereby vary a volume of the chamber able to receive inlet air from the intake system; wherein the actuator is configured to vary the position of the movable element at a frequency, wherein the frequency varies according to the rotational speed of the engine. Any preceding example further comprises, additionally or optionally, the chamber comprises a neck portion and a cavity portion, the neck portion having a smaller diameter than the cavity portion, wherein a component of a mainstream flow velocity where the neck portion meets the intake duct is perpendicular to a central axis of the neck portion. Any or all of the preceding examples further comprising, additionally or optionally, an orifice configured to permit a flow of inlet air both into and out of the chamber, wherein the intake duct and the orifice are configured such that the component of the mainstream flow velocity where the orifice meets the intake duct is perpendicular to a central axis of the orifice. In any or all of the preceding examples, additionally or optionally, the engine comprises one or more engine inlets, the engine inlets configured selectively to open to permit the inlet air to enter the cylinders. In any or all of the preceding examples, additionally or optionally, the actuator is configured to vary each of the position of the movable element and the frequency at which the position of the movable element varies, according to an opening of the engine inlets. In any or all of the preceding examples, additionally or optionally, the actuator is configured to vary a phase difference between a movement of the movable element relative to the rotation of the engine, according to the opening of the engine inlets. In any or all of the preceding examples, additionally or optionally, the actuator is configured to vary each of the position of the movable element and the frequency at which the position of the movable element is varied based on a distance between the chamber and the engine inlet that is being opened. In any or all of the preceding examples, additionally or optionally, the intake duct further comprises an inlet manifold configured to carry inlet gases to each of the cylinders, wherein the chamber is in fluid communication with the intake manifold and the chamber is provided substantially centrally on the inlet manifold.

Another example engine method comprises: adjusting a frequency of vibration of a movable element provided within a cavity of a resonance system based on an engine speed; the resonance system fluidically coupled to an engine intake system supplying intake air to each of a plurality engine cylinders. In any of the preceding examples, additionally or optionally, adjusting the frequency of vibration of the movable element includes increasing the frequency of vibration of the movable element until a frequency of pressure waves generated in the intake system is equal to a determined second harmonic frequency of engine speed. In any or all of the preceding examples, additionally or optionally, adjusting the frequency of vibration of the movable element further includes decreasing the frequency of vibration of the movable element until the frequency of pressure waves generated in the intake system is equal to the determined second harmonic frequency of the engine speed. In any or all of the preceding examples, additionally or optionally, adjusting the frequency of vibration includes, during engine combusting operation at a substantially constant rotational speed, adjusting the frequency of vibration of the movable element to generate pressure waves in the intake system. In any or all of the preceding examples, additionally or optionally, the frequency of vibration of the movable element is further based on each of a timing of opening and a sequence of opening of a plurality of inlet valves supplying air to the plurality of engine cylinders, the frequency of vibration adjusted to position the pressure waves at a location of the one or more inlet valves when one of the plurality of the inlet valves is opened. Any or all of the preceding examples further comprising, additionally or optionally, varying a phase difference between a movement of the movable element and the engine speed based on each of the timing of opening and the sequence of opening of the plurality of inlet valves. In any or all of the preceding examples, additionally or optionally, the frequency of vibration of the movable element is further based on a distance between the resonance system and one of the plurality of the inlet valves that is open.

In yet another example, an engine system comprises: a crankshaft position sensor, an intake system including an air inlet, an intake compressor, a hot inlet duct, a cooler, and a cold inlet duct leading to an inlet manifold, one or more inlet valves coupled to the inlet manifold regulating entry of air into one or more engine cylinders, one or more resonant systems fluidically coupled to the intake system to regulate frequency of pressure waves in the intake system, each resonant system comprising a movable element positioned within a chamber creating a cavity in the chamber, an actuator to vibrate the movable element within the chamber, and an orifice allowing a flow of air both into and out of the chamber, and a controller with computer readable instructions stored on non-transitory memory for: in response to a change in a rotational speed of the engine, varying a frequency of vibration of the movable element to generate pressure waves in the inlet manifold, wherein a frequency of the pressure waves generated in the intake system is equal to the second harmonic frequency of the rotational speed of the engine. In any preceding example, additionally or optionally, one of the one or more resonant systems is coupled to the inlet manifold at a central position, upstream of the cooler. In any or all of the preceding examples, additionally or optionally, one of the one or more resonant systems is coupled to one end the inlet manifold, downstream of each of the one or more inlet valves. In any or all of the preceding examples, additionally or optionally, one of the one or more resonant systems is coupled to the hot inlet duct, downstream of the intake compressor and upstream of the cooler. In any or all of the preceding examples, additionally or optionally, the controller includes further instructions for: adjusting the frequency of vibration of the movable element based on a timing of opening and a sequence of opening of the one or more inlet valves to position the pressure waves at the inlet manifold when each one of the one or more inlet valves open.

In this way, by adjusting the position of a movable element in a resonance system and the frequency of change in position of the movable element, the volume of the engine intake system may be adjusted in order to adjust the position of a higher pressure region at the inlet manifold when the inlet valves are opened. By positioning the higher pressure region at the intake manifold when the inlet valves open, the air within the cylinder may be charged to a higher pressure, thereby. Increasing engine power output and efficiency. The technical effect of adjusting the frequency of vibration of the movable element based on engine speed is that resonance in the engine intake system may be achieved at different engine speeds. By achieving resonance in the engine intake system at each engine speed, volumetric efficiency of the engine may be improved. Overall, by adjusting the resonance system based on engine speed and schedule of inlet valve opening, engine power and fuel efficiency may be improved.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine intake system comprising:
   an intake duct configured to carry inlet air to cylinders of the engine;
   a chamber provided to one side of the intake duct and in fluid communication with the intake duct;
   a movable element provided within the chamber; and
   an actuator configured to vary a position of the movable element and thereby vary a volume of the chamber able to receive inlet air from the intake system; wherein the actuator is configured to vary the position of the movable element at a frequency, wherein the frequency varies according to the rotational speed of the engine.

2. The system of claim 1, wherein the chamber comprises a neck portion and a cavity portion, the neck portion having a smaller diameter than the cavity portion, wherein a component of a mainstream flow velocity where the neck portion meets the intake duct is perpendicular to a central axis of the neck portion.

3. The system of claim 2, further comprising, an orifice configured to permit a flow of inlet air both into and out of the chamber, wherein the intake duct and the orifice are configured such that the component of the mainstream flow velocity where the orifice meets the intake duct is perpendicular to a central axis of the orifice.

4. The system of claim 1, wherein the engine comprises one or more engine inlets, the engine inlets configured selectively to open to permit the inlet air to enter the cylinders.

5. The system of claim 4, wherein the actuator is configured to vary each of the position of the movable element and the frequency at which the position of the movable element varies, according to an opening of the engine inlets.

6. The system of claim 4, wherein the actuator is configured to vary a phase difference between a movement of the movable element relative to the rotation of the engine, according to the opening of the engine inlets.

7. The system of claim 4, wherein the actuator is configured to vary each of the position of the movable element and the frequency at which the position of the movable element is varied based on a distance between the chamber and the engine inlet that is being opened.

8. The system of claim 1, wherein the intake duct further comprises an inlet manifold configured to carry inlet gases to each of the cylinders, wherein the chamber is in fluid communication with the intake manifold and the chamber is provided substantially centrally on the inlet manifold.

9. An engine method comprising:
   adjusting a frequency of vibration of a movable element provided within a cavity of a resonance system based on an engine speed; the resonance system fluidically coupled to an engine intake system supplying intake air to each of a plurality engine cylinders.

10. The method of claim 9, wherein adjusting the frequency of vibration of the movable element includes increasing the frequency of vibration of the movable element until a frequency of pressure waves generated in the intake system is equal to a determined second harmonic frequency of engine speed.

11. The method of claim 10, wherein adjusting the frequency of vibration of the movable element further includes decreasing the frequency of vibration of the movable element until the frequency of pressure waves generated in the intake system is equal to the determined second harmonic frequency of the engine speed.

12. The method of claim 9, wherein adjusting the frequency of vibration includes, during engine combusting operation at a substantially constant rotational speed, adjusting the frequency of vibration of the movable element to generate pressure waves in the intake system.

13. The method of claim 9, wherein the frequency of vibration of the movable element is further based on each of a timing of opening and a sequence of opening of a plurality of inlet valves supplying air to the plurality of engine cylinders, the frequency of vibration adjusted to position the pressure waves at a location of the one or more inlet valves when one of the plurality of the inlet valves is opened.

14. The method of claim 13, further comprising, varying a phase difference between a movement of the movable element and the engine speed based on each of the timing of opening and the sequence of opening of the plurality of inlet valves.

15. The method of claim 9, wherein the frequency of vibration of the movable element is further based on a distance between the resonance system and one of the plurality of the inlet valves that is open.

16. An engine system comprising:
   a crankshaft position sensor;
   an intake system including an air inlet, an intake compressor, a hot inlet duct, a cooler, and a cold inlet duct leading to an inlet manifold;
   one or more inlet valves coupled to the inlet manifold regulating entry of air into one or more engine cylinders;
   one or more resonant systems fluidically coupled to the intake system to regulate frequency of pressure waves in the intake system, each resonant system comprising a movable element positioned within a chamber creating a cavity in the chamber, an actuator to vibrate the movable element within the chamber, and an orifice allowing a flow of air both into and out of the chamber; and
   a controller with computer readable instructions stored on non-transitory memory for: in response to a change in a rotational speed of the engine, varying a frequency of vibration of the movable element to generate pressure waves in the inlet manifold, wherein a frequency of the pressure waves generated in the intake system is equal to the second harmonic frequency of the rotational speed of the engine.

17. The system of claim 16, wherein one of the one or more resonant systems is coupled to the inlet manifold at a central position, upstream of the cooler.

18. The system of claim 16, wherein one of the one or more resonant systems is coupled to one end the inlet manifold, downstream of each of the one or more inlet valves.

19. The system of claim 16, wherein one of the one or more resonant systems is coupled to the hot inlet duct, downstream of the intake compressor and upstream of the cooler.

20. The system of claim 16, wherein the controller includes further instructions for: adjusting the frequency of vibration of the movable element based on a timing of opening and a sequence of opening of the one or more inlet valves to position the pressure waves at the inlet manifold when each one of the one or more inlet valves open.

* * * * *